United States Patent
Seo (10) Patent No.: US 8,345,919 B2
(45) Date of Patent: Jan. 1, 2013

(54) MOTION DETECTING DEVICE, MOTION DETECTING METHOD, IMAGING DEVICE, AND MONITORING SYSTEM

(75) Inventor: Koichiro Seo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1188 days.

(21) Appl. No.: 12/031,007

(22) Filed: Feb. 14, 2008

(65) Prior Publication Data

US 2008/0199051 A1    Aug. 21, 2008

(30) Foreign Application Priority Data

Feb. 15, 2007    (JP) .................................. 2007-034443

(51) Int. Cl.
*G06K 9/00* (2006.01)

(52) U.S. Cl. ....................................................... 382/103

(58) Field of Classification Search ........................ None
See application file for complete search history.

(56) References Cited

U.S. PATENT DOCUMENTS

| | | | | |
|---|---|---|---|---|
| 6,125,145 A | * | 9/2000 | Koyanagi et al. | 375/240.16 |
| 2003/0215141 A1 | * | 11/2003 | Zakrzewski et al. | 382/190 |

FOREIGN PATENT DOCUMENTS

| | | |
|---|---|---|
| JP | 06-165012 | 10/1994 |
| JP | 09-219854 | 8/1997 |
| JP | 2001-008228 | 1/2001 |

OTHER PUBLICATIONS

Japanese Office Action issued on Feb. 10, 2009 corresponding to JP 2007-034443.

* cited by examiner

*Primary Examiner* — Claire X Wang

(74) *Attorney, Agent, or Firm* — SNR Denton US LLP (57) ABSTRACT

A motion detecting device, a motion detecting method, an imaging device, and a monitoring system are provided. The motion detecting device include a processing unit for performing a process of determining a presence or absence of motion by comparing brightness difference information with a detection parameter of a motion detection, the brightness difference information being obtained from a video signal outputted from an image sensor, and a controller for controlling the detection parameter using control information determined by property control of an imaging device including the image sensor.

8 Claims, 11 Drawing Sheets

MOTION DETECTING DEVICE, MOTION DETECTING METHOD, IMAGING DEVICE, AND MONITORING SYSTEM

CROSS REFERENCES TO RELATED APPLICATIONS

The present application claims benefit of priority of Japanese patent Application No. 2007-34443 filed in the Japanese Patent Office on Feb. 15, 2007, the entire contents of which are incorporated herein by reference.

BACKGROUND OF THE INVENTION

1. Field of the Invention

The present invention relates to a motion detecting device, a motion detecting method, an imaging device, and a monitoring system. In particular, it relates to a motion detecting device for detecting a motion of a subject from a video signal, a motion detecting method therefor, an imaging device including the motion detecting device, and a monitoring system using the imaging device.

2. Description of Related Art

A motion detecting device, specifically, a motion detecting device which detects a motion of a subject from a video signal, is used for monitoring a suspicious person in a monitoring system and as a trigger of a DVR (Digital Video Recording). For example, the monitoring system intends to alleviate a load of a monitoring person and to effectively record (record a necessary scene only), and controls to analyze a video outputted from a monitoring camera (in this case, detect motion within an image area) to issue a warning to the monitoring person or to record a recoding device.

As a motion detecting method of the motion detecting device, an interframe difference method and a background difference system are generally known. The interframe difference method is a technique in which an interframe brightness difference between a video signal outputted from an image sensor and a video signal delayed by one frame is measured, and the brightness difference is compared with a previously set detection threshold value, thereby detecting a presence or absence of motion. The background difference method is a technique in which a background image is produced by an arithmetic operation from a video signal outputted from an image sensor, a brightness difference between the inputted video signal and the background image (background model) is measured, and the brightness difference is compared with a previously set detection threshold value, thereby detecting a presence or absence of motion.

The motion detecting device using these detecting methods generally divides an image area into N×M of blocks, evaluates an average value thereof, and decreases a resolution, thereby alleviating an amount of arithmetic operation. The background image may be created by the following expression (1):

$$B(m,n,t) = (1-\alpha)B(m,n,t-1) + \alpha I(m,n,t) \quad (1),$$

where $\alpha$ denotes a time constant of $0 \leq \alpha \leq 1$, $B(m,n,t)$ denotes a background image of coordinates $(m, n)$ at a time $t$, and $I(m,n,t)$ denotes an input image of coordinates $(m, n)$ at the time $t$.

In a usual camera system, a brightness signal is integrated to find out a brightness level within the image area; an aperture (F-number), a shutter speed, and an AGC (Automatic Gain Control) gain or the like are controlled such that the integrated brightness value approaches a control target value; and AE (Auto Exposure) control in which an exposure is automatically determined is performed.

In a monitoring system using the camera system in which such AE control is performed is used as the monitoring camera, when the arithmetic operation of the expression (1) is performed in detecting a motion, a brightness change resulting from an actual motion of a subject and a brightness change resulting from the AE control cannot be separated (or estimated). As a result, the brightness change resulting from the AE control also is detected as the motion of the subject, so that a false alarm is issued. Such a false alarm increases labor of the monitoring person or causes a recording even if no motion has occurred, which leads to prevention of an effective recording.

To separate the brightness change resulting from the actual motion of the subject and the brightness change resulting from the AE control, it may be considered to adopt a method in which a threshold value of the motion detection is set large in advance. However, when the measure in which the detected threshold value is set large in advance is adopted, there is a demerit in that sensitivity of the detection decreases.

Therefore, in the existing technologies, based on a concept that edges exist in the actual motion, an edge detecting circuit for detecting edge portions of the subject from a video signal outputted from the monitoring camera and a video signal delayed by one frame is used to increase detection precision of the motion detection based on a detection result of the edge detecting circuit (for example, see Japanese Unexamined Patent Application Publication No. 2001-8228, hereinafter referred to as "Patent Document 1").

SUMMARY OF THE INVENTION

However, in the developing technique described in the Patent Document 1, it is necessary to provide an extra circuit which is an edge detecting circuit, and a frame memory or the like may become necessary so as to construct the edge detecting circuit. Thus, there arises an issue in that a circuit size becomes large and a cost increases.

Accordingly, it is desirable to provide a detecting device capable of surely detecting a motion of a subject in a simple circuit configuration by separating a brightness change resulting from an actual motion of the subject and a brightness change resulting from AE control, a motion detecting method, an imaging device including the motion detecting device, and a monitoring system using the imaging device.

In accordance with an embodiment of the present invention, there is provided a motion detecting device including a processing unit for performing a process of determining a presence or absence of motion by comparing brightness difference information with a detection parameter of a motion detection, the brightness difference information being obtained from a video signal outputted an image sensor, and a controller for controlling the detection parameter using control information determined by property control of an imaging device including the image sensor. The motion detecting device may be used to an imaging device including a motion detecting device. Furthermore, the imaging device may be used to a monitoring system as a monitoring camera therefor.

In the motion detecting device, imaging device including the motion detecting device, and monitoring system using the imaging device, not only brightness difference information but also control information determined by property control of the imaging device are used to control a detection parameter of the motion detection as information for detecting motion of a subject. Accordingly, even if a brightness within an image area is changed due to the property control of the imaging device, it is possible to perform the motion detection while distinguishing whether the brightness change results from an actual motion of the subject or from the property control by controlling the detection parameter using the control information.

According to an embodiment of the present invention, without using an extra circuit such as an edge detecting device, motion detection is performed while distinguishing whether a brightness change within an image area resulting from an actual motion of a subject or from property control by a simple circuit configuration. Therefore, it may eliminate a false detection in which it is determined that the brightness change results from the motion of the subject in spite of the fact that the brightness change does not result from the actual motion of the subject.

DETAILED DESCRIPTION OF EMBODIMENTS

With reference to drawings, embodiments of the present invention will be described in detail below.

First Embodiment

An imaging device according to a first embodiment of the present invention is described. Herein, the imaging device includes: an image sensor such as a CCD image sensor, a CMOS image sensor or the like; an optical system for focusing an image light of a subject on an imaging surface (light receiving surface) of the image sensor; and a signal processing circuit for processing an output signal of the image sensor. The imaging device refers to a camera module used by being mounted on an electronic device such as a mobile telephone or the like, and a camera system such as a digital still camera, a video camera or the like on which the camera module is mounted.

[Imaging Device]

Figure 1:
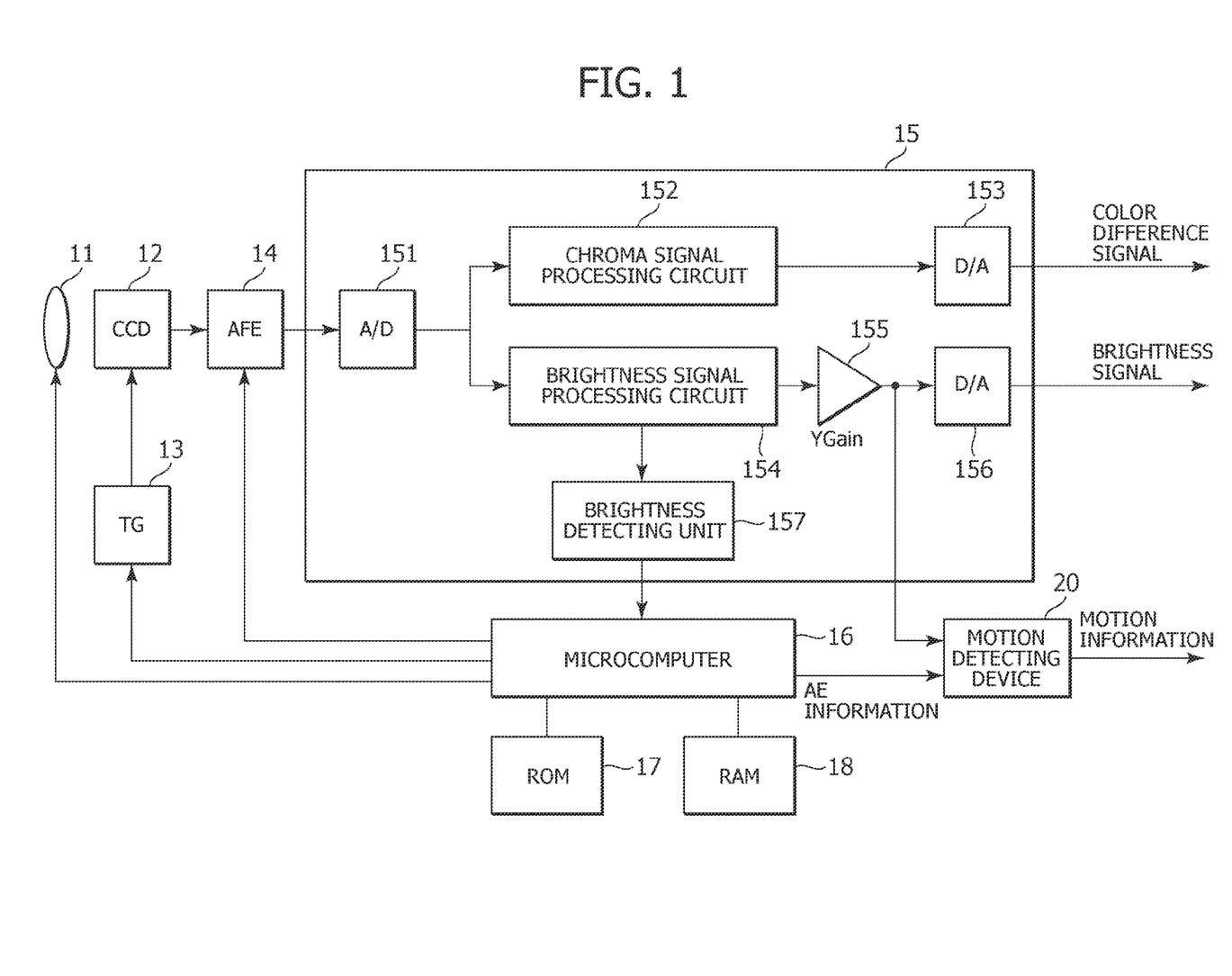
FIG. 1 is a system configuration diagram showing one example of a configuration of an imaging device according to a first embodiment of the present invention.

FIG. 1 is a system block diagram showing one example of a configuration of the imaging device according to the first embodiment of the present invention. In FIG. 1, an incident light (image light) from a subject (not shown) is focused by an optical system including a lens 11 onto an imaging surface (light receiving surface) of a solid-state image sensor such as a CCD image sensor 12, for example.

The solid-state image sensor is not limited to the CCD image sensor 12, but may include another charge-transfer solid-state image sensor and an X-Y address type solid-state image sensor represented by a CMOS image sensor.

Under the drive of various timing signals generated in a timing generator (TG) 13, the CCD image sensor 12 performs an operation in which the subject is imaged and an imaging signal thereof is outputted such as: a reading-out drive of a signal charge photoelectrically converted in each pixel to a vertical transferring unit; a transfer drive of the vertical transferring unit and a horizontal transferring unit; a conversion of the signal charge into an electric signal, and so on.

The imaging signal outputted from the CCD image sensor 12 is subjected to a process such as a CDS (Correlated Double Sampling), an AGC (Automatic Gain Control) or the like in an analog front end (AFE) unit 14, and thereafter, the resultant signal is supplied to a camera signal processing circuit 15.

The camera signal processing circuit 15 is configured to include: an A/D converting circuit 151; a chroma (C) signal processing circuit 152; a D/A converting circuit 153; a brightness (Y) signal processing circuit 154; an amplifying circuit 155; a D/A converting circuit 156; and a brightness detecting unit 157.

The A/D converting circuit 151 converts an analog signal inputted via the analog front end unit 14 from the CCD image sensor 12 into a digital signal. The digital signal is supplied to the chroma signal processing circuit 152 and the brightness signal processing circuit 154.

The chroma signal processing circuit 152 performs an arithmetic operation on three-primary color signals of R (red), G (green), and B (blue) by a predetermined arithmetic expression to generate color difference signals Cr(R−Y) and Cb(B−Y). The color difference signals are converted into an analog signal in the D/A converting circuit 153, and then outputted therefrom.

The brightness signal processing circuit 154 performs addition of the three-primary color signals of R, G, and B at a predetermined ratio to generate a brightness signal. The brightness signal is multiplied by a factor of YGain by the amplifying circuit 155, and thereafter, the resultant signal is converted into an analog signal by the D/A converting circuit 156, and then outputted therefrom.

To find out a brightness level on an image area, the brightness detecting unit 155 integrates (detects) the brightness signal of a handling area of the CCD image sensor 12 for a certain period, for example, a 1-field period (or 1-frame period), and passes an integrated result thereof (integrated brightness value) to a microcomputer 16.

The microcomputer 16 receives the integrated brightness value from the brightness detecting unit 157 by each field (or by each frame) and starts AE control for controlling a device such that the integrated brightness value approaches a control target value (AE reference), whereby a whole of a system is controlled.

A typical device to be controlled in the AE control includes, but not limited to, an aperture of the lens 11, the AGC gain in the analog front end 14, and a shutter speed at the time of operation of an electronic shutter of the CCD image sensor 12. The AE control is described in detail later.

A ROM 17 stores a program for controlling the whole of the system under the control of the microcomputer 16. A RAM 18 temporarily stores various data used at the time that the microcomputer 16 controls based on the program stored in the ROM 17, data obtained as a result of various processes, or the like.

The motion detecting device 20 is a motion detecting device according to an embodiment of the present invention. The motion detecting device 20 detects motion of the subject based on a video signal (for example, brightness data), and control information, for example AE information obtained by the AE control, determined by property control of the imaging device under the control of the microcomputer 16. A specific configuration and operation of the motion detecting device 20 is described in detail later.

(AE Control)

Figure 2:
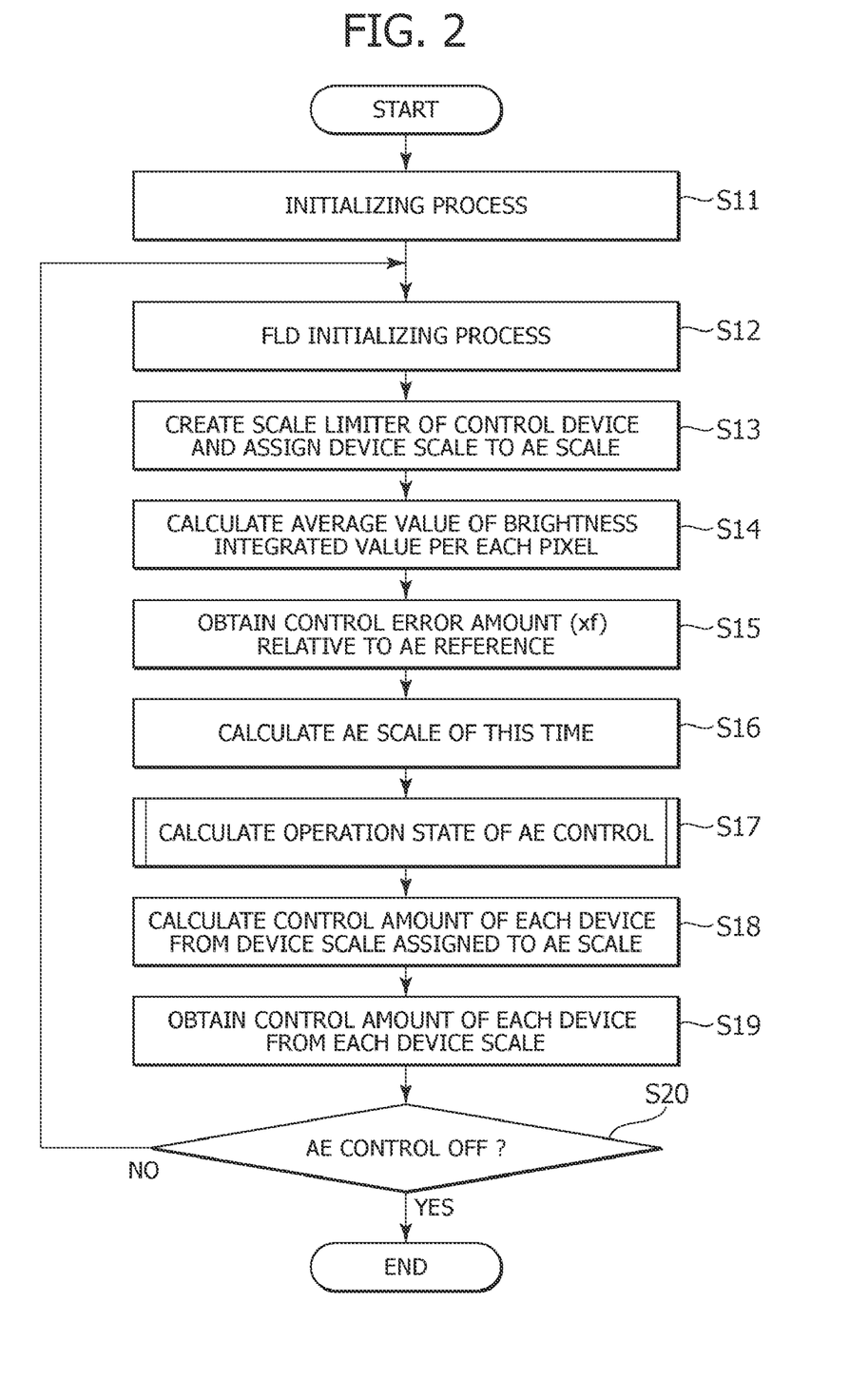
FIG. 2 is a flowchart showing a control procedure of general AE control.
Figure 3:
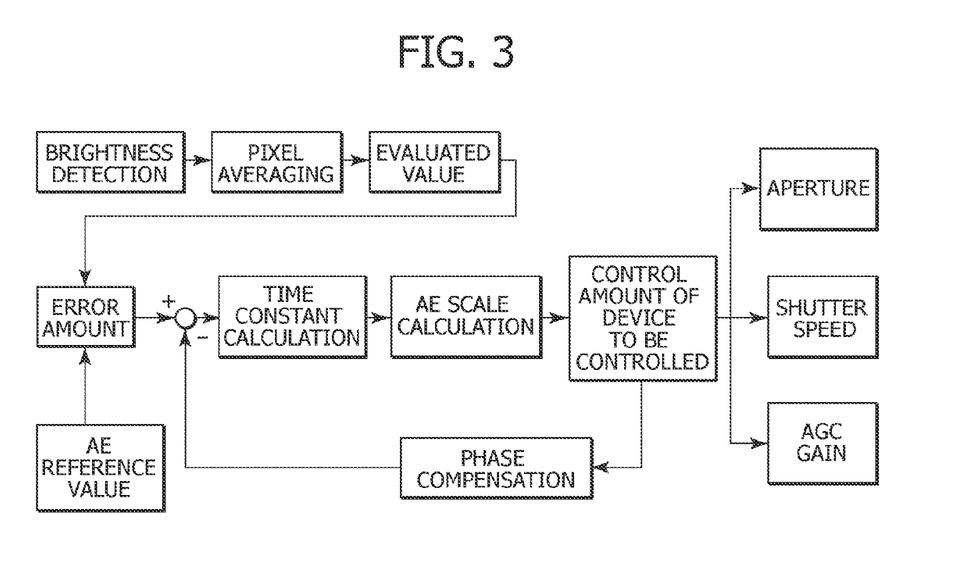
FIG. 3 is a chart showing a procedure of a signal in the general AE control.

A control procedure of general AE control is shown in FIG. 2, and a procedure of signal in the AE control is shown in FIG. 3. The AE control is executed under the control of the microcomputer 16 as described above.

In the flowchart in FIG. 2, firstly, an initializing process for the AE control is performed (step S11). Subsequently, an initializing process executed by each field (FLD) is performed (step S12). Thereafter, a scale limiter of a device to be controlled is created, and a device scale is assigned to an AE scale (step S13).

Subsequently, the integrated brightness value Xf detected in the brightness detecting unit 157 is used to calculate a brightness integral average value per each pixel (step S14), and then a control error amount E (xf) relative to an AE reference value (target value of the AE control) Xref is obtained (step S15). The control error amount E (xf) is expressed by a function of the integrated brightness value Xf and the AE reference value Xref, as shown in the following expression (2).

$$E(xf)=2^n \log_2(Xf^2/Xref_2) \quad (2)$$

Subsequently, an AE scale Sn of this time is calculated (step S16) according to the following expression (3).

$$Sn=(1-\alpha)Sn-1+\alpha E(xf) \quad (3)$$

where α denotes a time constant in the above-described expression (1), and $0 \leq \alpha \leq 1$. That is, when a deviation from the AE reference value, i.e., the control error amount E(xf), is multiplied by the time constant α, the AE scale Sn is calculated.

Next, an operation state of the AE control is calculated (step S17). Subsequently, from the device scale assigned to the AE scale Sn, a control amount of each device to be controlled, i.e., the aperture, the AGC gain, and the shutter speed, for example, is calculated (step S18). Thereafter, the control amount of each device is obtained (step S19) from each device scale. The processes in the steps S12 to S19 are repeatedly executed until the AE control determines "OFF" in step S20.

Figure 4:
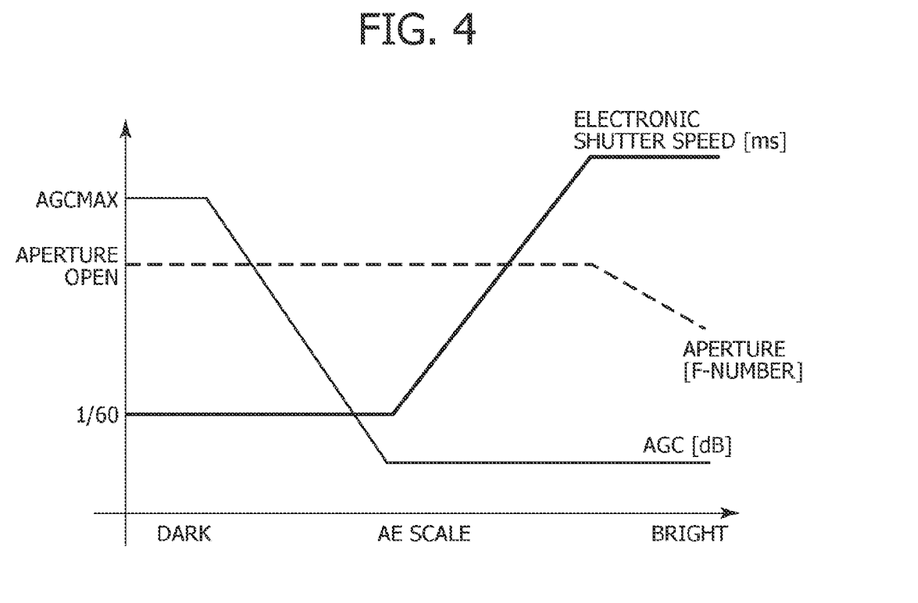
FIG. 4 shows a graph showing a relationship between an AE scale and a control amount of a device to be controlled.

FIG. 4 shows a relationship of the AE scale and the control amount of the device to be controlled. In FIG. 4, a change point of each line is set in advance. Setting is made such that one device to be controlled is assigned to one value of the AE scale value.

In an imaging device in which such AE control is performed, there may occur a case where the brightness within the image area is changed resulting from the AE control even though no motion has occurred within the image area. At this time, when the motion detection is performed by using the brightness difference information only, there occurs a false detection in which the brightness change results from motion of the subject is detected even though the brightness change does not result from the actual motion of the subject, as described above.

[Motion Detecting Device]

The motion detecting device 20 according to an embodiment of the present invention has a feature that that a motion detection of the subject is performed by using not only the brightness difference information but also the control information determined by the property control of the imaging device under the control of the microcomputer 16. More specifically, control is dynamically performed in accordance with a detection parameter of the motion detection, i.e., the control information in which a detection threshold value is determined by the above-described control, for example.

As the control information determined by the control by the microcomputer 16, the AE information obtained by the AE control in which the brightness is controlled, for example, is used. However, the control information is not limited to the AE information, and AWB information obtained by AWB (Auto White Balance) control in which a color is controlled, AF information obtained by AF (Auto Focus) control, or the like, may be used.

As described above, the detection parameter of the motion detection is dynamically controlled using the control information, not only the brightness difference information but also the control information determined by the property control of the imaging device, as the information for the motion detection of the subject. As a result, without using an extra circuit such as an edge detecting device, it may perform the motion detection in a simple circuit configuration even when there is the brightness within the image area is changed resulting from the property control of the imaging device while distinguishing whether the brightness change results from the actual motion of the subject or from the property control of the imaging device. Thus, it may eliminate a false detection in which the brightness change resulting from the motion of the subject is detected in spite of the fact that the brightness change does not result from the actual motion of the subject.

As one example, an example of photo-taking for the motion detection indoor is now given. For example, when a blind of a window is opened, motion is caused on the blind, and thus, movement of the blind is detected. Entering an external light in a room through the opened blind causes a change to a brightness level of a whole of an image area. At this time, the AE control is performed, and thus, a brightness change is generated in the whole of the image area.

In this manner, with existing technology in which a motion detection is performed using only brightness difference information when the brightness change is caused in the whole of the image area resulting from the property control such as AE control of the imaging device, a false detection may occur. The false detection is caused by detecting not only motion of the blind but also the brightness change resulting from the AE control as a motion within the image area. Contrary thereto, according to a method of the present invention, the detection threshold value of the motion detection is dynamically controlled using the property control information of the imaging device. Thus, the motion detection is performed while distinguishing whether the brightness change results from the actual motion of the subject or from the property control. As a result, it can avert the false detection of the brightness change resulting from the property control.

Subsequently, using FIGS. 5 and 6, specific embodiments of the motion detecting device 20 according to an embodiment of the present invention are described. Hereinafter, the description is made by using a case where as the control information determined by the control in the microcomputer 16, the AE information obtained by the AE control which controls the brightness is employed, for example. However, the control information is not limited to the AE information, and the AWB information obtained by the AWB (Auto White Balance) control which controls a color may be used.

First Embodiment

Figure 5:
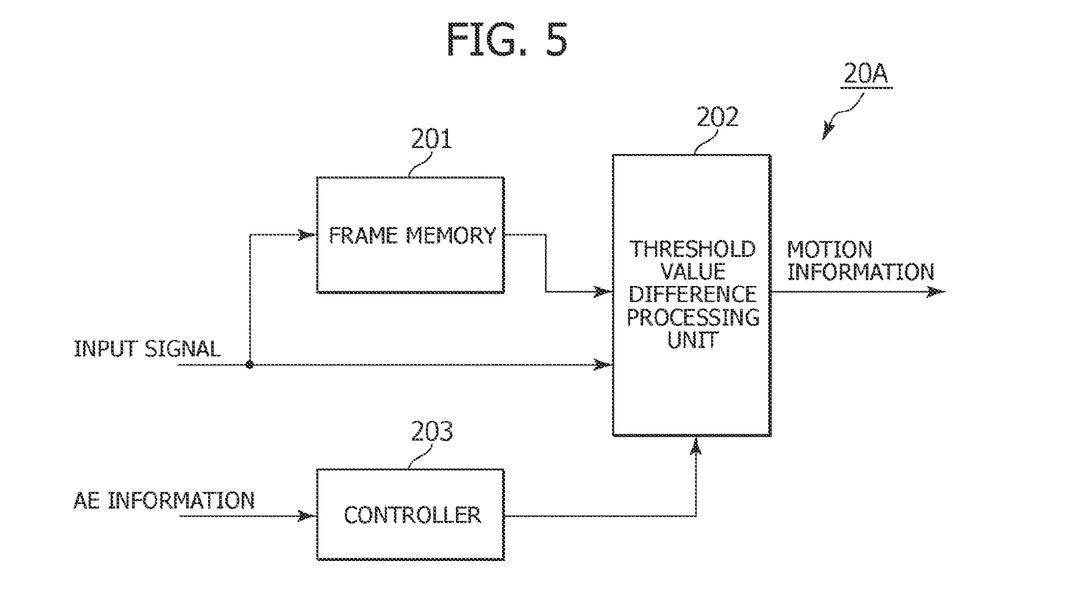
FIG. 5 is a block diagram showing a motion detecting device according to the first embodiment.

FIG. 5 is a block diagram showing a motion detecting device 20A, according to a first embodiment, which is applied to an interframe difference method.

The motion detecting device 20A according to the first embodiment includes a frame memory 201 and a threshold value difference processing unit 202. The device 20A obtains an interframe brightness difference between an input video signal and a one-frame delayed input video signal in the frame memory 201, in the threshold value difference processing unit 202, and then compares the brightness difference with a detection threshold value set in advance, whereby a presence or absence of a motion is detected.

In addition, the motion detecting device 20A according to the first embodiment includes a controller 203 inputted with the AE information, and dynamically modifies a detection parameter, i.e., a detection threshold value, for example, of the motion detection in the threshold value difference processing unit 202 according to the AE information under the control of the controller 203.

Figure 7:
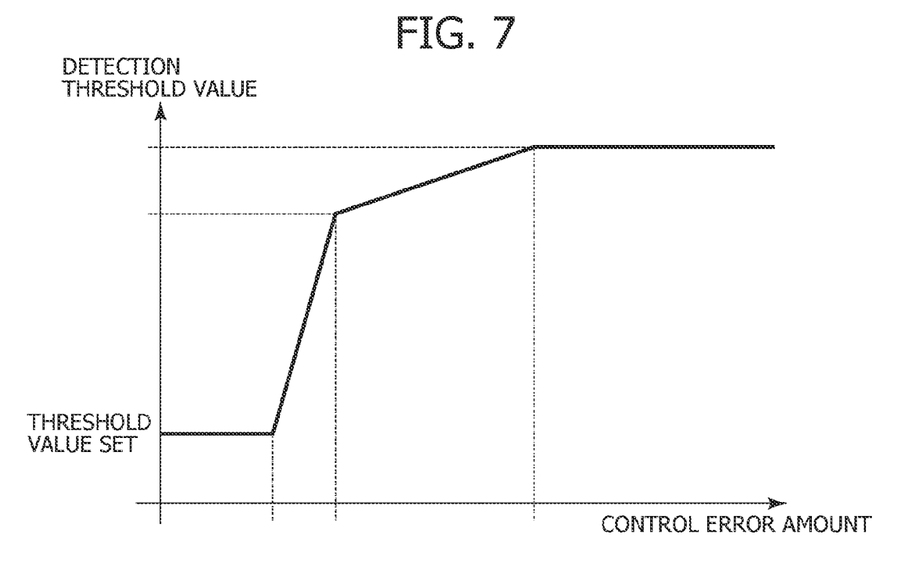
FIG. 7 is a graph showing a table of a control error amount and a detection threshold value.

In the thus-configured motion detecting device 20A according to the first embodiment, when the control error amount (xf) obtained by a process of the AE control, i.e., a deviation from a target value of the AE control, is large, this means that a pixel value inputted from now on is greatly changed by device control. As shown in FIG. 7, a table in which a horizontal axis represents the control error amount E (xf) and a vertical axis represents the detection threshold value of the motion detection is set in advance. As shown in FIG. 7, the inventor of the subject application confirms that a better result is produced when a setting is made by a table of an increasing function.

As described above, as the information for the motion detection of the subject, the detection parameter of the motion detection in accordance with the AE information is dynamically controlled using not only the brightness difference information but also the property control, for example, the AE information determined by the AE control. Thereby, even if the brightness within the image area is changed resulting from the AE control, the motion detection can be performed while distinguishing whether the brightness change results from the actual motion of the subject or from the AE control. As a result, it can eliminate a false detection in which it is determined that the brightness change results from the motion of the subject even though the brightness change does not result from the actual motion of the subject.

Second Embodiment

Figure 6:
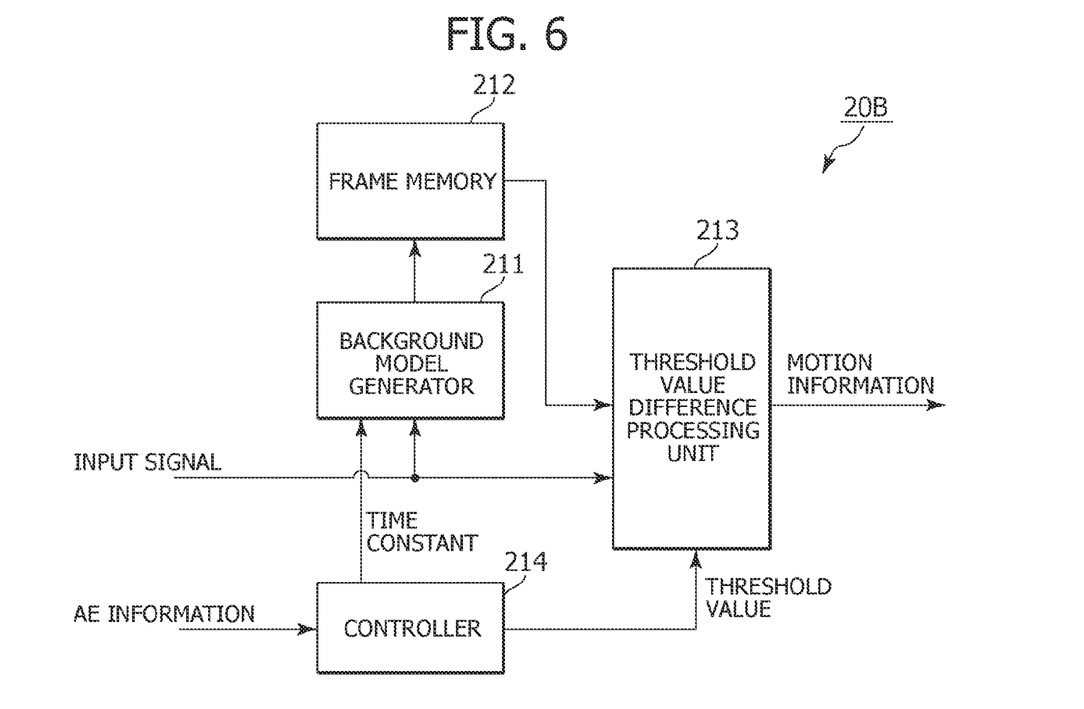
FIG. 6 is a block diagram showing a motion detecting device 20A according to a second embodiment.

FIG. 6 is a block diagram showing a motion detecting device 20B, according to a second embodiment, which is applied to a background difference method.

The motion detecting device 20B according to the second embodiment includes: a background model generator 211; a frame memory 212; and a threshold value difference processing unit 213. The motion detecting device 20B creates a background image from an input video signal by the arithmetic operation of the expression (1) in the background model generator 211, and measures in the threshold value difference processing unit 213 a brightness difference between the input video signal and the background model delayed by one frame in the frame memory 212. Then the brightness difference is compared with a detection threshold value set in advance, whereby a presence or absence of motion is detected.

In addition, the motion detecting device 20B according to the second embodiment includes a controller 214 inputted with the AE information. The device 20B dynamically modifies a detection parameter of the motion detection, i.e., a detection threshold value of the threshold value difference processing unit 213, for example, and a time constant $\alpha$ in the expression (1) using the AE information under the control of the controller 214. The time constant $\alpha$ is a learning coefficient for constructing the background model (background image).

Herein, the expression (1) is now considered. The expression (1) represents a background model B (m, n, t) at a time t. The expression means that the larger a value of the time constant $\alpha$, the larger a weight of an input image I (m, n, t) this time, and the closer the value of the time constant $\alpha$ to 0 (zero), more likely to trust an image (m, n, t−1) of a past.

Accordingly, when the AE control is not performed and the whole of the image area has the same brightness value, a more stable condition is established when the value of the time constant $\alpha$ is as small as possible in creating the background model. On the other hand, it may not be preferable in creating the background model that the past information is continuously held even though the AE control is performed and the brightness value within the image area is thereby changed.

Figure 8:
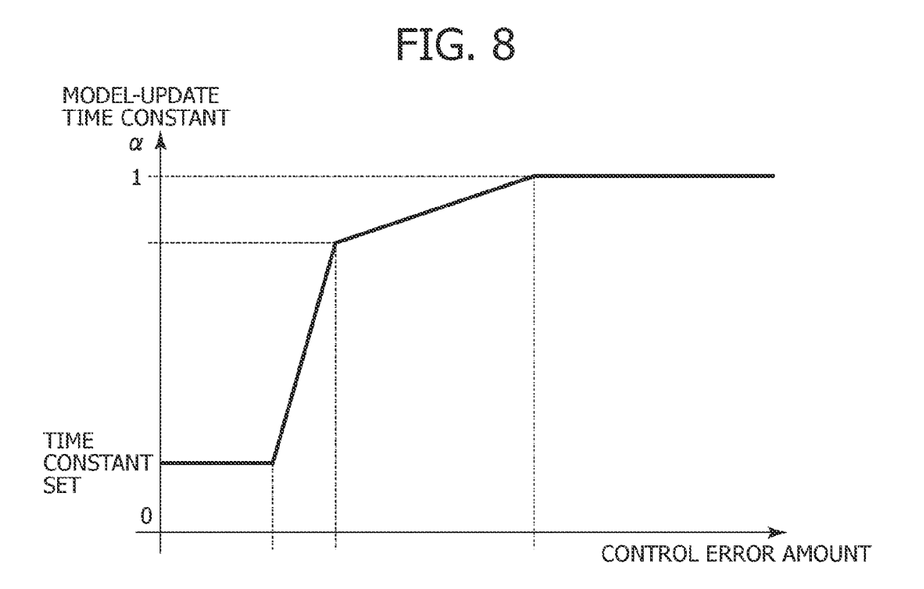
FIG. 8 is a graph showing a table of a control error amount and a model update time constant.

In this regard, in the motion detecting device 20B according to the second embodiment, as shown in FIG. 8, a table in which a horizontal axis represents the control error amount (xf) and a vertical axis represents the time constant $\alpha$ of the model update is set in advance. Similar to the case of the motion detecting device 20A according to the first embodiment, when the control error amount E (xf) obtained by the process of the AE control is large, the brightness value set is changed to the detection threshold value obtained from the table set in advance, as shown in FIG. 7, and in addition thereto, the time constant set is changed to the time constant $\alpha$ obtained from the table set in advance, as shown in FIG. 8.

More specifically, when the brightness change by the AE control becomes increasingly large, the time constant $\alpha$ is controlled such that a contribution of a past image B (m, n, t−1) applied to the background model creation is decreased. This means that the past information which cannot be trusted is discarded. As a result, a highly precise background model can be created.

As described above, as the information for the motion detection of the subject, not only the brightness difference information but also the property control of the imaging device, for example, the AE information determined by the AE control, is used to dynamically control the detection parameter of the motion detection, for example the learning coefficient (time constant $\alpha$) for constructing the background model, using the AE information. Thus, even if the brightness within the image area is changed resulting from the AE control, a highly precise background model is created. Therefore, it is possible to perform the motion detection while distinguishing whether the brightness change results from the actual motion of the subject or from the AE control. As a result, it may eliminate a false detection in which it is determined that the brightness change results from the motion of the subject even though the brightness change does not result from the actual motion of the subject.

In the second embodiment, both the detection threshold value of the motion detection and the time constant $\alpha$ of the background model creation are dynamically controlled using the A information, but it may also configure to control at least only one of these. In particular, when the configuration such that the time constant $\alpha$ only is controlled is adopted, the background model having a highly precise time constant $\alpha$ of the background model creation is created. Thus, detection precision of the motion detection when the brightness within the image area is changed resulting from the AE control can be increased. However, when the configuration such that both the detection threshold value and the time constant $\alpha$ are controlled is adopted, the detection precision of the motion detection can surely be increased.

(Issues with Illuminance Change in Photographing Environment)

Figure 9:
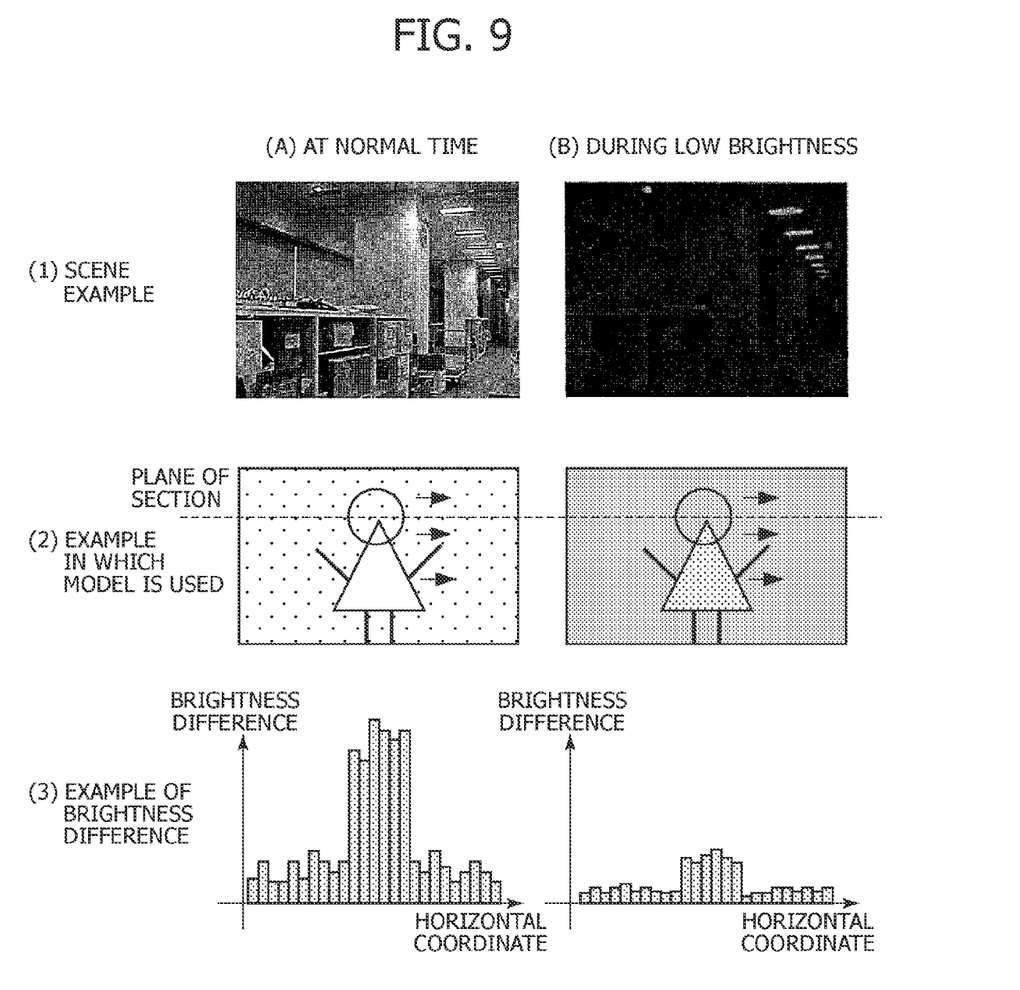
FIGS. 9A and 9B are drawings each showing a comparative example between a state (A) in which a sufficient illuminance is provided at a normal time and a state (B) in which a low illuminance is provided.

When the motion detection is performed while photographing all through day and night, the motion detection may not sometimes be performed if a signal level within the image area becomes small as a whole at night and on other occasions. FIGS. 9A and 9B show comparative examples in which FIG. 9A shows a state in which a sufficient illuminance is provided at a normal time and FIG. 9B shows a state of a low illuminance.

FIGS. 9A(1) and 9B(1) each shows an example of a scene at the time that an indoor light is turned on (brightness level: large) and that at the time the indoor light is turned off (brightness level: small); FIGS. 9A(2) and 9B(2) each shows an example of a case where a model is moved; and FIGS. 9A(3) and 9B(3) each shows an example of a brightness difference in a dotted line in the case where each model in FIGS. 9A(2) and 9B(2) is moved, respectively.

In the illuminance state in FIG. 9A at the normal time, the sufficient brightness level is reached, and thus a sufficient brightness difference exists between a moving subject area and a still subject area. On the contrary, when it is in the low illuminance state of FIG. 9B, the brightness difference is not easily generated between the motion subject area and the still subject area.

Figure 10:
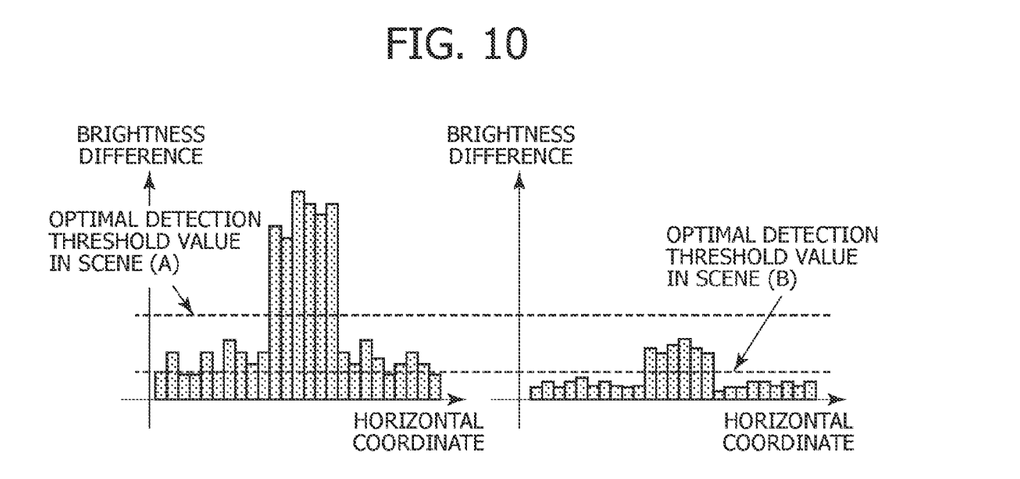
FIG. 10 shows graphs each showing an example of an optimal detection threshold value when a dynamic detection is performed in respective scenes of the normal illuminance state (A) and the low illuminance state (B)

FIG. 10 shows examples of optimal detection threshold values when the motion detections are performed in the respective scenes. When the optical threshold value in the scene in FIG. 9A is applied to the scene in FIG. 9B, the motion of the motion subject cannot be detected. This results in a failed alarm in a monitoring system using the motion detecting device. When the optimal threshold value in the scene in FIG. 9B is applied to the scene in FIG. 9A, the still motion area is also detected as motion. This results in a false alarm in a monitoring system using the motion detecting device.

For an illuminance change in such a photographing environment, it may consider a method in which illuminance of a photographing environment is estimated from time information and a detection threshold value of a motion detection is controlled according to the estimated illuminance. The method provides an advantageous effect when monitoring an interior of a room in which a light is set low regularly according to a time, for example. However, the time and the illuminance are not necessarily constant in the case of an outdoor monitoring or the like. For example, due to a revolution of the earth and a gradient of an axis of the earth, a duration of sunshine changes day by day. Thus, a failed alarm and a false alarm may be generated.

Third Embodiment

The feature of a third embodiment includes the detection threshold value of the motion detection is controlled using the control information such as AE information determined by the property control of the imaging device under the control of the microcomputer 16, whereby a issue caused with the illuminance change in the photographing environment is solved.

In view point that the detection threshold value of the motion detection is controlled using the AE information, the detecting device in the third embodiment is the same in configuration as the motion detecting device 20A according to the first embodiment in FIG. 5, for example, but is different from the motion detecting device 20A in specific control in the controller 203.

Figure 11:
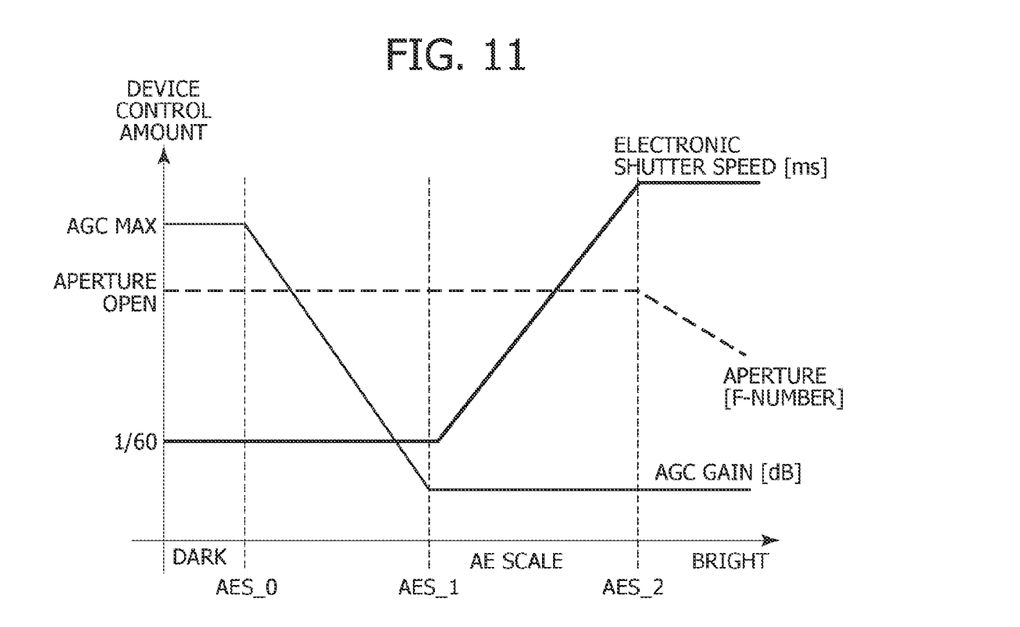
FIG. 11 is a graph showing a corresponding table between an AE scale Sn, and a device to be controlled and a device control amount.

As described above, in the AE control, in the process in the step S15 of FIG. 2, the device to be controlled and the control amount thereof are determined by the deviation from the AE reference value. The deviation is calculated by multiplying the control error amount E (xf) by the time constant $\alpha$. FIG. 11 shows a corresponding table between the AE scale Sn, and the device to be controlled and the device control amount.

More specifically, when the brightness level within the image area (brightness integrated value per each pixel) is larger (brighter) than a target value (AE reference value), control is performed such that an aperture is closed (focused on) to increase a shutter speed, whereby a light-receiving amount is decreased. Contrary, when the brightness level within the image area is smaller (darker) than the target value, control is performed such that the aperture is opened to decrease the shutter speed, whereby the light-receiving amount is increased.

When the shutter speed is decreased unlimitedly, the light amount can logically be increased. However, in the case of a video camera, there is a limit to the shutter speed depending on a format. For example, for an NTSC system, the shutter speed is 1/30 [sec], and for a PAL system, it is 1/25 [sec].

When exceeding the limit (a state of AE scale<AES_1 in FIG. 11), the shutter speed is fixed to a lower limit to increase the AGC gain, thereby attempting to improve the brightness level. However, in this case, there is a demerit in that an S/N is deteriorated, and thus an image quality is disturbed. Consequently, the AGC gain is generally controlled last.

In this manner, when the AGC gain is increased, the S/N is decreased. Accordingly, an upper limit is previously provided to the AGC gain amount in consideration of influence applied to the image quality. This is exemplified in the case of AE scale<AES_0 in FIG. 11.

In such a case, the brightness level within the image area is small relative to the target value. However, if the upper limit has been already exceeded, the brightness is not further improved. A state shown in the image area in FIG. 9B is that in which the AGC gain value is affixed to a maximum value AGC_MAX.

Figure 12:
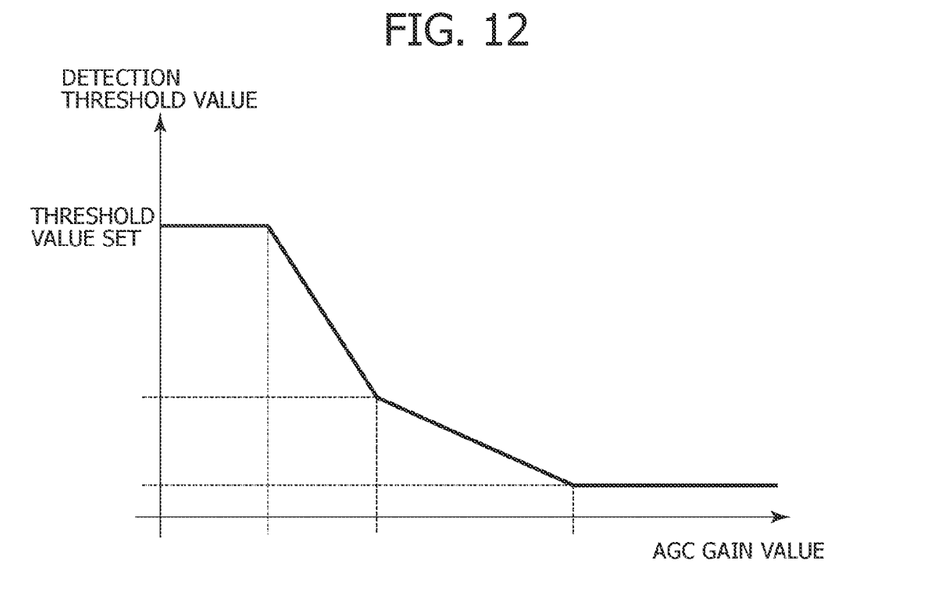
FIG. 12 is a graph showing a table of an AGC gain amount and a detection threshold value.

When this is utilized, a signal amount of the whole of the image area may be estimated from the AGC gain value. As shown in FIG. 12, a table in which a horizontal axis is the AGC gain amount (control amount of the AGC gain) and a vertical axis is the detection threshold value of the motion detection is set in advance. The detection threshold value of the motion detection is dynamically controlled using the AGC gain value with reference to the table.

In this manner, the detection threshold value of the motion detection is dynamically controlled using the AGC gain value obtained from property control information, for example the AE information, of the imaging device, and the detection threshold value is set to the optimal value according to the illuminance in the photographing environment. Thus, in a photographing environment of a low illuminance such as at night or in a room in which lights are extinguished, even when the signal level within the image area is rendered small as a whole, a detection sensitivity of the motion detection can be improved, thereby enabling a stable detection operation.

(Control Example)

Herein, when the control of the detection threshold value according to the first or second embodiment and that of the detection threshold value according to the third embodiment are used in combination, it is desired that the both controls are exclusively executed. Using a flowchart in FIG. 13, a description is given of a control example.

Firstly, it is determined whether the AE is in a stable state, that is, whether the AE is in a converged state (step S21). The determination whether the AE is in a converged state is described later. When the AE is not in a stable state, that is, when the brightness change is generated within the image area by the AE control, the detection threshold value of the motion detection is controlled according to the control error amount E (xf) obtained in the step S15 of FIG. 2 (step S22). Subsequently, the time constant α of the background model update is controlled according to the control error amount E (xf) (step S23).

Herein, the case where the control of the detection threshold value and the time constant α in the motion detecting device 20B according to the second embodiment is used as an example to describe a procedure thereof. In the case of the control of the detection threshold value in the motion detection device 20A according to the first embodiment, the process in the step S23 of FIG. 13 may be omitted.

On the other hand, in the step S21, when it is determined that the AE is in a stable state, this is a case where the brightness value of the whole of the image area is stable, and there is no brightness change within the image area. In this case, from the AE scale Sn calculated in the step S15 of FIG. 2, the AGC gain value is obtained based on the table in FIG. 11, and according to the AGC gain value, the detection threshold value of the motion detection is controlled. More specifically, the detection threshold value of the motion detection is modified based on the table in FIG. 12 (step S24) from the AGC gain value.

(Convergence Determining Algorithm)

Figure 14:
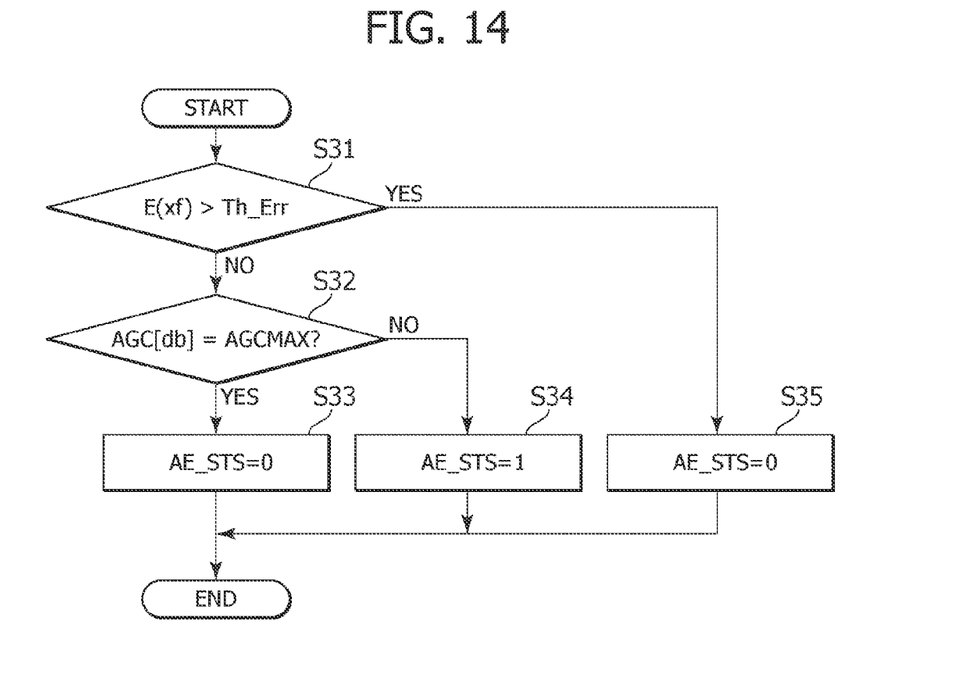
FIG. 14 is a flowchart showing an algorithm for determining whether AE is in a converged state.

FIG. 14 is a flowchart showing an algorithm for determining whether the AE is in a converged state.

Firstly, it is determined whether the control error amount E (xf) obtained by the process of the AE control is larger than a threshold value Th_Err, that is, whether the brightness change caused by the AE control is estimated (step S31). When the control error amount E (xf) is larger than the threshold value Th_Err, it is determined whether the AGC gain value is affixed to the maximum value AGC_MAX (step S32). The determination in the step S32 corresponds to that of AE scale<AES_0 in FIG. 11.

Figure 13:
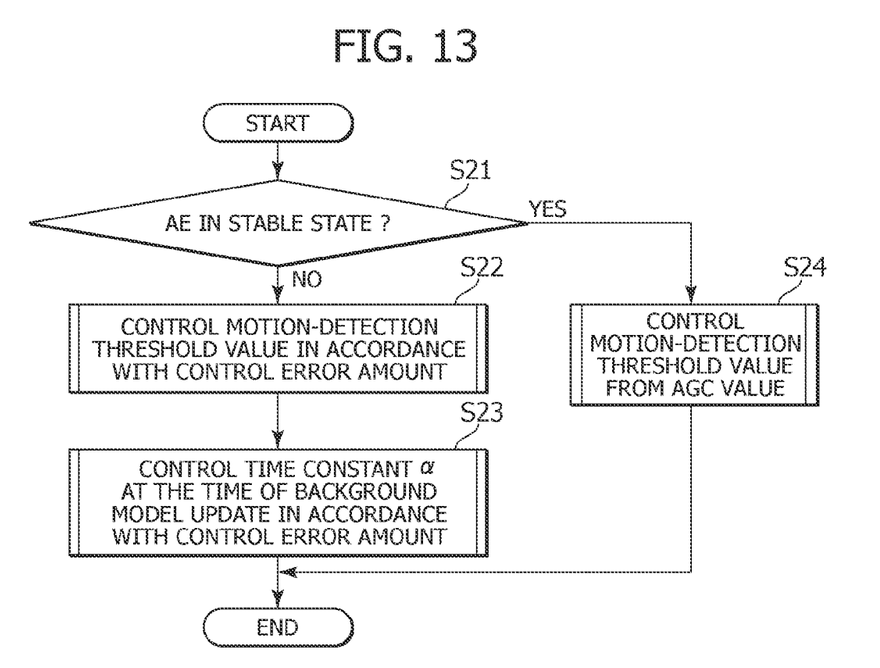
FIG. 13 is a flowchart showing a procedure of a control example when control of a detection threshold value according to the second embodiment and a detection threshold value according to a third embodiment are used in combination.

As a determination result of whether the brightness change is generated, AE_STS=0 if the AGC gain value=AGC_MAX holds true or AE_STS=1 if the AGC gain value<AGC_MAX AE_STS=0 holds true in the determination in the step S32, and AE_STS=0 if E(xf)≦Th_Err holds true in the determination at the step S31 are passed to an algorithm of the motion detection in FIG. 13, respectively. Herein, AE_STS=0 represents that the AE is being converged and there is no brightness change within the image area, and AE_STS=1 represents that the AE is being operated and the there is the brightness change within the image area.

In the algorithm of the motion detection in FIG. 13, in the determining process in the step S21, it is determined that the AE is not in a stable state, and the control of the detection threshold value and the time constant α according to the AE information are executed when AE_STS=1 is received from the convergence determining algorithm in FIG. 14. When AE_STS=0 is received, it is determined that the AE is in a stable state and the control of the detection threshold value according to the AGC gain value is executed.

[Monitoring System]

Figure 15:
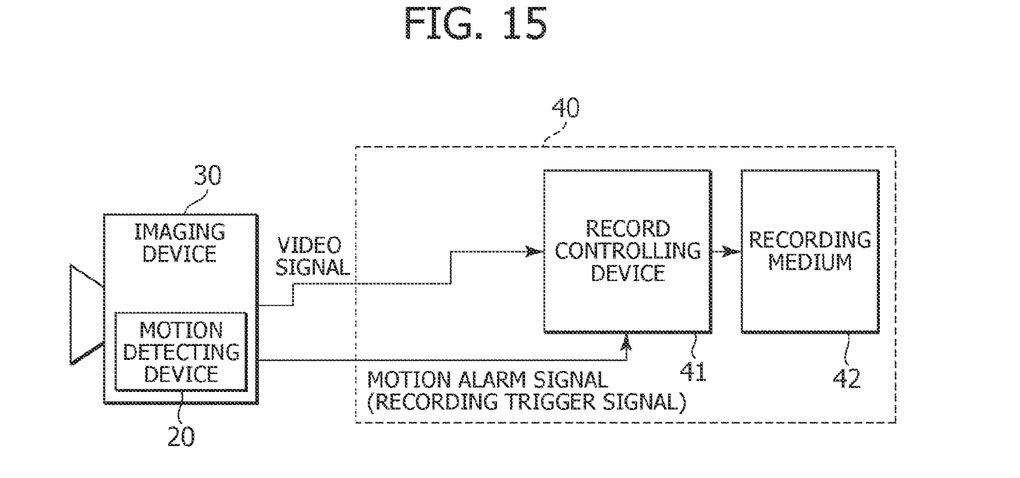
FIG. 15 is a system block diagram showing a configuration example of a monitoring system in which an imaging device including a motion detecting device 20 according to the first embodiment is used as a monitoring camera.

FIG. 15 is a system block diagram showing a configuration example of a monitoring system in which an imaging device including the motion detecting device 20 according to the first embodiment is used as a monitoring camera. As shown in FIG. 15, the monitoring system is configured by an imaging device 30 including the motion detecting device 20 according to the first embodiment and a video recording device 40 including a record controlling device 41 or the like.

The record controlling device 41 controls such that when motion information is provided from the motion detecting device 20 arranged in the imaging device 30, a motion alarm signal is issued to a monitoring person by using the motion information as a trigger. The device 41 also controls such that a video signal outputted from a camera signal processing circuit (which corresponds to the camera signal processing circuit 15 in FIG. 1) within the imaging device 30 is recorded on a recording medium 42, and so on.

In this manner, in the monitoring system for monitoring a suspicious person or the like, when the imaging device 30 including, in particular containing, the motion detecting device 20 according to the first embodiment is used as the monitoring camera, when the motion detecting device 20 is the motion detecting device according to the first or second embodiment, even if there is the brightness change, which results from the property control of the imaging device, on the image area, the motion detection is performing while distinguishing whether the brightness change results from the actual motion of the subject or from the property control. Thus, a false detection can be eliminated, thereby eliminating a false alarm.

When the motion detecting device according to the third embodiment is used as the motion detecting device 20, even if the signal level within the image area becomes small as a whole in a photographing environment of a low illuminance such as at night or in a room in which lights are extinguished, the detection sensitivity of the motion detection is improved, so that a stable detection operation can be performed, whereby the failed alarm can be eliminated.

Second Embodiment

When the monitoring system is configured to contain the motion detecting device not on an imaging device side but on a video recording device side (configuration in the existing technology), there is only a video signal outputted from the imaging device that is the information for analyzing a video, that is, information for detecting the motion within the image area. Thus, when an expansion process is performed by an electronic zoom function imparted with the imaging device, the motion detecting device contained in the video recording device detects only a motion within an expanded video area (display area) outputted from the imaging device.

Figure 16:
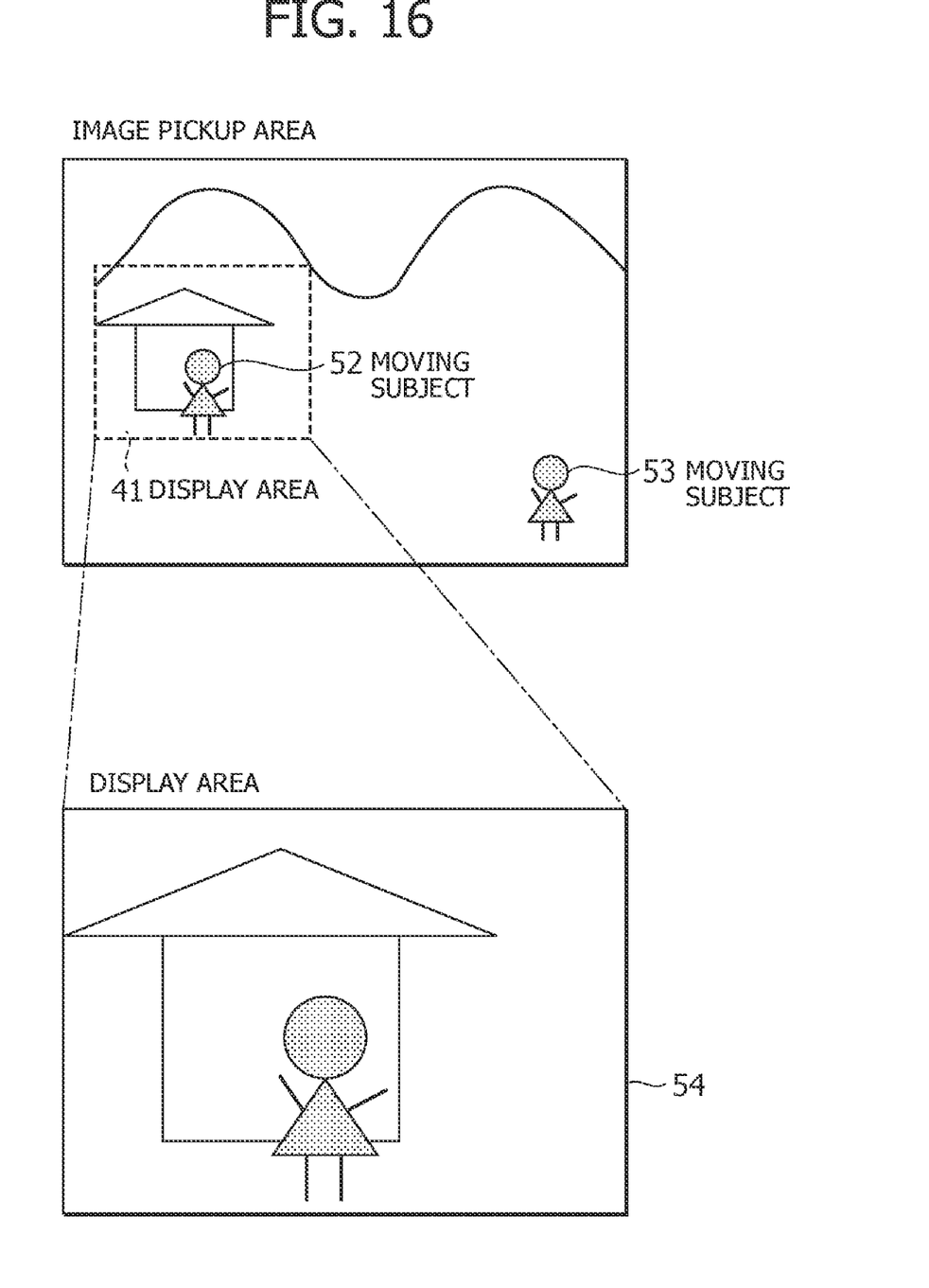
FIG. 16 is a diagram describing a relationship between an image pickup area and a motion detectable area.

More specifically, in FIG. 16, when it is considered that a display or a recoding is performed by expanding an area 51, a motion of a moving subject 52 which exists within the area 51 may be detected. However, a motion of a moving subject 53 which is imaged in an image sensor but not projected in an expanded display area 54 cannot be detected.

In view of this point, an imaging device which becomes capable of performing a motion detection relative to a whole of an image pickup area by an image sensor even when an expansion process is performed is a below-described imaging device according to a second embodiment of the present invention.

Figure 17:
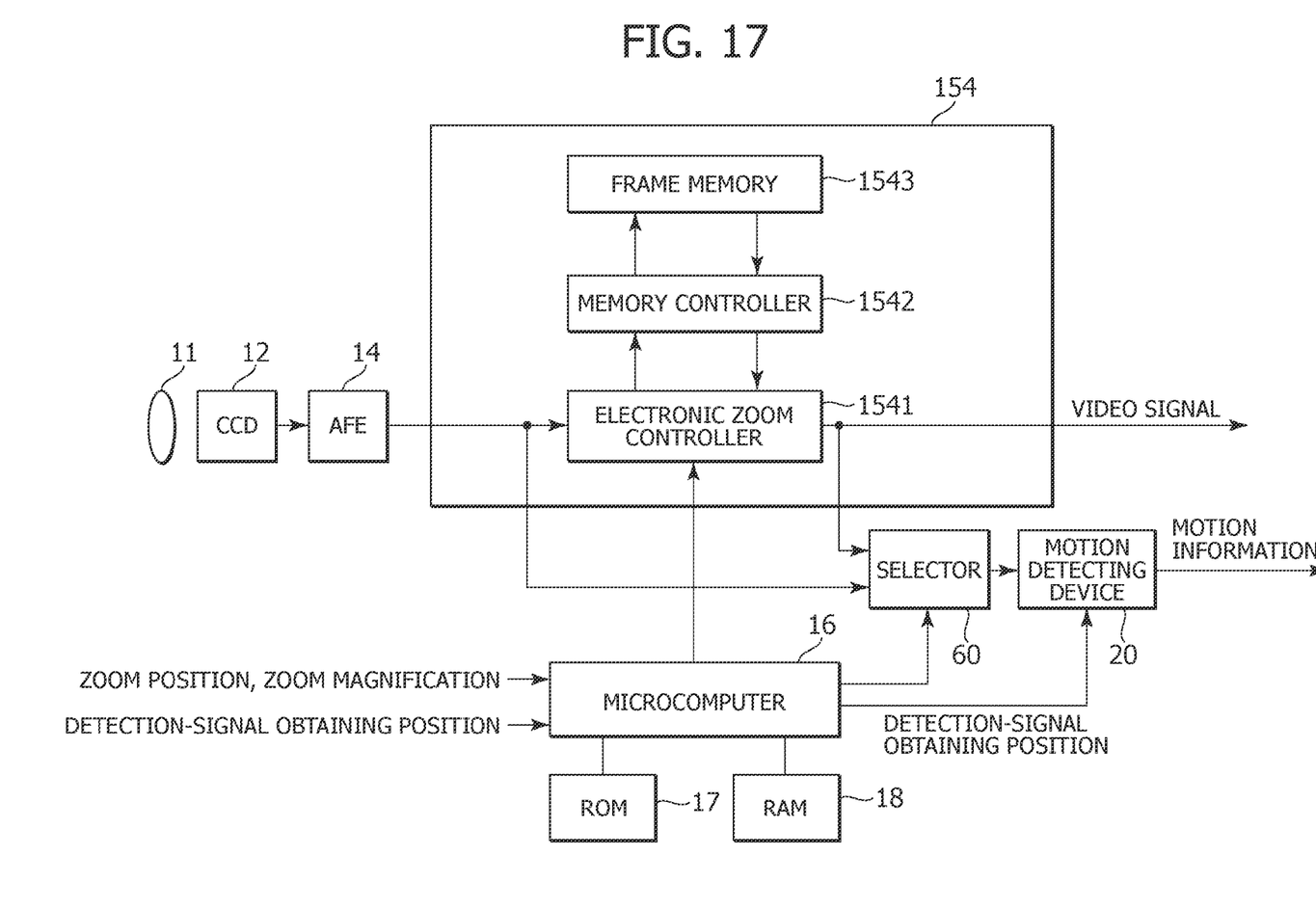
FIG. 17 is a system configuration diagram showing one example of a configuration of an imaging device according to the second embodiment of the present invention.

FIG. 17 is a system block diagram showing one example of a configuration of the imaging device according to the second embodiment of the present invention. In the figure, like parts as those in FIG. 1 are designated by like reference numerals. It is noted that herein, regarding the camera signal processing circuit, the chroma signal processing circuit 152 in FIG. 1 is omitted and only a part of the brightness signal processing circuit 154 is shown for the sake of simple illustration.

The imaging device according to the embodiment is provided with an electronic zoom function for performing an electric expanding process on a part of an image, imaged by the CCD image sensor 12, within an image pickup area. The electronic zoom function is obtained as follows: in the brightness signal processing circuit 154, under the control of an electronic zoom controller 1541, an inputted video signal is stored via a memory controller 1542 in a frame memory 1543, and in this state, an arbitrary area is cut out from the frame memory 1543 and an interpolation is performed. At this time, information on a zoom position or a zoom magnification is provided by a user to the microcomputer 16, and provided from the microcomputer 16 to the electronic zoom controller 1541.

In this manner, an embodiment of the imaging device having the electronic zoom function is configured to include the motion detecting device 20 in the imaging device and a selector 60 provided in a preceding stage of the motion detecting device 20. As the motion detecting device 20, the motion detecting devices according to the above-described embodiments 1 to 3 may be used, but the motion detection device 20 is not limited thereto.

The selector 60 inputs a video signal inputted to the electronic zoom controller 1541 and a video signal outputted from the electronic zoom controller 1541. Furthermore, the selector 60 selects either one of the video signals and supplies it to the motion detecting device 20 under the control of the microcomputer 16.

Herein, when the electronic zoom controller 1541 does not perform the expanding process, the input signal and the output signal of the electronic zoom controller 1541 are fundamentally the same video signal. On the other hand, when the electronic zoom controller 1541 performs the expanding process, the input signal of the electronic zoom controller 1541 is an unexpanded video signal, that is, a video signal of the image pickup area imaged by the CCD image sensor 12 while the output signal of the electronic zoom controller 1541 is an expanded video signal.

The microcomputer 16 controls the selector 60 automatically or under a command by a user such that the selector 60 selects either one of the video signal inputted to the electronic zoom controller 1541 when the electronic zoom controller 1541 performs the expanding process or the video signal outputted from the electronic zoom controller 1541 when the electronic zoom controller does not perform the expanding process, and supplies the selected video signal to the motion detecting device 20.

As described above, when the imaging device having the electronic zoom function performs the expanding process by the electronic zoom controller 1541, the video signal outputted from the electronic zoom controller 1541 is inputted to the motion detecting device 20, so that the motion detecting device 20 becomes capable of performing the motion detection based on the expanded video signal. Thus, in FIG. 16, even a motion of the moving subject 53 in a non-display area not projected in the expanded display area 54 can be detected.

Thereby, in the monitoring system shown in FIG. 15, when the imaging device according to the embodiment is used as the monitoring camera (imaging device 30), at the time of projecting the video signal expanded by the electronic zoom function on a monitor to monitor an expanded image, a motion of an area not displayed on the monitor can also be detected by the motion detecting device of the imaging device and when there is the motion, a warning to a monitoring person may be issued. Therefore, it is possible to alleviate a load of the monitoring person and to perform a more exact monitoring as well.

It should be understood by those skilled in the art that various modifications, combinations, sub-combinations and alternations may occur depending on design requirements and other factors insofar as they are within the scope of the appended claims or equivalents thereof.

What is claimed:

1. A motion detecting device comprising:
   an imaging device having an image sensor;
   a processing unit operable to perform a process of determining a presence or absence of motion by comparing brightness difference information with a detection parameter of a motion detection, the brightness difference information being obtained from a video signal output from the image sensor; and
   a controller operable to receive control information related to the imaging device and modify the detection parameter of the motion detection based on the control information of the imaging device, the control information determined by one of (i) an automatic exposure control operable to control an exposure of the imaging device in response to a brightness level within an image area picked up by the image sensor, and (ii) an automatic gain control operable to control a gain of the video signal in response to a brightness level within an image area picked up by the image sensor.

2. The motion detecting device according to claim 1, wherein:
   the controller performs the process by obtaining an inter-frame brightness difference between the video signal and a delayed video signal delayed by one frame is obtained and comparing the brightness difference with a detection threshold value of the motion detection, and
   the controller controls the detection threshold value using the control information.

3. The motion detecting device according to claim 1, wherein:
   the controller performs the process by producing a background image by an arithmetic operation from the video signal, obtaining a brightness difference between the video signal and the background image, and comparing the brightness difference with a detection threshold value of the motion detection, and the controller controls at least one of the detection threshold value and a learning coefficient for constructing the background image using the control information.

4. A motion detecting method comprising:

determining a presence or absence of motion by comparing brightness difference information with a detection parameter of a motion detection, the brightness difference information being obtained from a video signal output from an image sensor of an imaging device; and modifying the detection parameter of the motion detection based on control information of the imaging device, the control information determined by one of (i) an automatic exposure control operable to control an exposure of the imaging device in response to a brightness level within an image area picked up by the image sensor, and (ii) an automatic gain control operable to control a gain of the video signal in response to a brightness level within an image area picked up by the image sensor.

5. The motion detecting method according to claim 4, further comprising determining whether the property control of the imaging device is in a stable state, wherein, when the determining step is not in a stable state, modifying the detection parameter based on control information determined by the automatic exposure control, and when the determining step is in a stable state, modifying the detection parameter based on control information determined by the automatic gain control by the image sensor.

6. An imaging device comprising:

an imaging device having an image sensor; and a motion detecting device operable to detect a presence or absence of motion of a subject based on a video signal output from the image sensor, wherein the motion detecting device includes, a processing unit operable to perform a process of determining a presence or absence of motion by comparing brightness difference information with a detection parameter of a motion detection, the brightness difference information being obtained from the video signal; and a controller operable to receive control information of the imaging device and modify the detection parameter of the motion detection based on the control information of the imaging device, the control information determined by one of (i) an automatic exposure control operable to control an exposure of the imaging device in response to a brightness level within an image area picked up by the image sensor, and (ii) an automatic gain control operable to control a gain of the video signal in response to a brightness level within an image area picked up by the image sensor.

7. A monitoring system comprising:

an imaging device having an image sensor; and a motion detecting device operable to detect a presence or absence of motion of a subject based on a video signal output from the image sensor to monitor the motion of the subject within an image area picked up by the image sensor using motion information output from the motion detecting device, wherein the motion detecting device includes, a processing unit operable to perform a process of determining a presence or absence of motion by comparing brightness difference information with a detection parameter of a motion detection, the brightness difference information being obtained from the video signal; and a controller operable to receive control information of the imaging device and modify the detection parameter of the motion detection based on the control information of the imaging device, the control information determined by one of (i) an automatic exposure control operable to control an exposure of the imaging device in response to a brightness level within an image area picked up by the image sensor, and (ii) an automatic gain control operable to control a gain of the video signal in response to a brightness level within an image area picked up by the image sensor.

8. The motion detecting device according to claim 1, wherein the detection parameter of the motion detection based on the automatic exposure control is dynamically controlled using the brightness difference information and the property control.

* * * * *